(12) United States Patent
Wan

(10) Patent No.: US 10,338,339 B2
(45) Date of Patent: Jul. 2, 2019

(54) LENS MODULE

(71) Applicant: Jia Wan, Shenzhen (CN)

(72) Inventor: Jia Wan, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 74 days.

(21) Appl. No.: 15/677,087

(22) Filed: Aug. 15, 2017

(65) Prior Publication Data

US 2018/0299634 A1  Oct. 18, 2018

(30) Foreign Application Priority Data

Apr. 15, 2017  (CN) .................... 2017 2 0399013 U

(51) Int. Cl.
  *G02B 7/02*  (2006.01)
  *G02B 27/00*  (2006.01)
  *G02B 5/00*  (2006.01)
  *G02B 13/00*  (2006.01)

(52) U.S. Cl.
  CPC ............. *G02B 7/021* (2013.01); *G02B 5/005* (2013.01); *G02B 7/022* (2013.01); *G02B 27/0018* (2013.01); *G02B 7/025* (2013.01); *G02B 13/004* (2013.01)

(58) Field of Classification Search
  CPC .......... G02B 7/00; G02B 7/021; G02B 7/022; G02B 7/023; G02B 7/025; G02B 7/026; G02B 7/028

USPC ........................................................ 359/819
See application file for complete search history.

(56) References Cited

U.S. PATENT DOCUMENTS

| 2006/0171046 | A1* | 8/2006 | Recco ................... G02B 7/021 359/811 |
| 2011/0150460 | A1* | 6/2011 | Lai .......................... G02B 7/021 396/529 |
| 2014/0160571 | A1* | 6/2014 | Miyazaki ................ G02B 3/00 359/614 |
| 2015/0241656 | A1* | 8/2015 | Choi ...................... G02B 7/021 359/738 |
| 2015/0293330 | A1* | 10/2015 | Gutierrez ........... G02B 13/0015 359/811 |
| 2017/0160511 | A1* | 6/2017 | Kim ....................... G02B 7/021 |
| 2017/0264801 | A1* | 9/2017 | Wang ................... G02B 3/0075 |

* cited by examiner

*Primary Examiner* — Jordan M Schwartz
(74) *Attorney, Agent, or Firm* — Na Xu; IPro, PLLC

(57) ABSTRACT

The present disclosure provides a lens module. The lens module includes a lens barrel including a first barrel wall forming an optical aperture and a second barrel bending and extending from the first barrel wall. The second barrel wall includes a first inner wall and a first outer wall opposite to the first inner wall. One lens is arranged in the lens barrel, and the lens includes a side wall connecting an object side and an image side, a part of the side wall from the lens attaching to the first inner wall. A gap is formed between another part of the side wall and the first inner wall. A size of the part forming the gap between the side wall and the first inner wall along a direction of an optical axis accounts for at least one second of a total height.

6 Claims, 2 Drawing Sheets

LENS MODULE

FIELD OF THE PRESENT DISCLOSURE

The present disclosure relates to imaging technologies, especially to a lens module.

DESCRIPTION OF RELATED ART

With a development of electronic equipment, various equipment like a cell phone and camera etc. include a lens module. The existing lens module includes a lens barrel and a lens set in the lens barrel. A first inner wall of the lens barrel is always a cylinder surface, so is a side wall of the lens. The lens is inserted and installed in the lens barrel, and the side wall of the lens is attached to the first inner wall of the lens barrel. While the light entering into the barrel from the present structure is passing through the lenses, various stray lights will also penetrate through various lenses and enter into an imaging surface receptor together, and cause the imaging quality decline, in which, the imaging surface receptor refers to an equipment that receives an image after imaging through the lens module.

Therefore it is necessary to provide an improved a lens module for overcoming the above-mentioned disadvantages.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
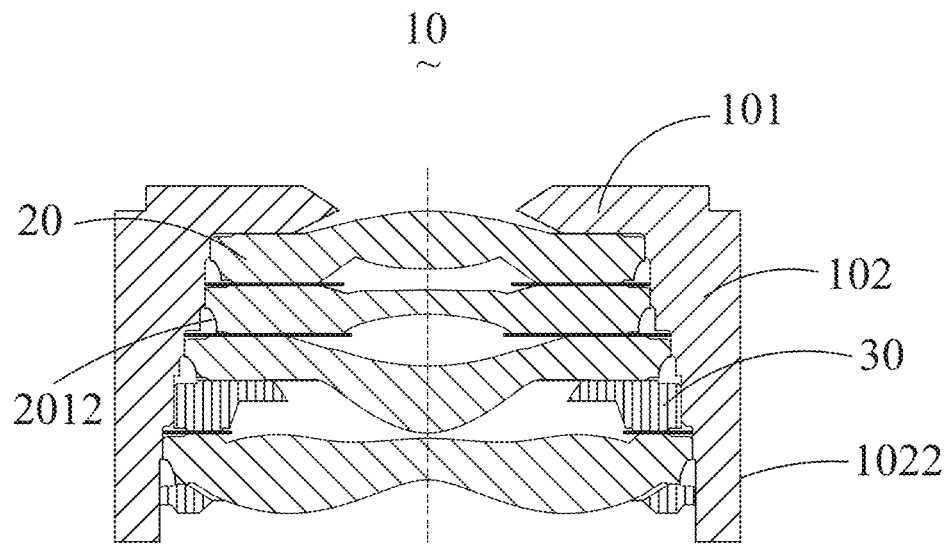
FIG. 1 is an illustrative cross-sectional view of a lens module in accordance with an exemplary embodiment of the present disclosure.
Figure 2:
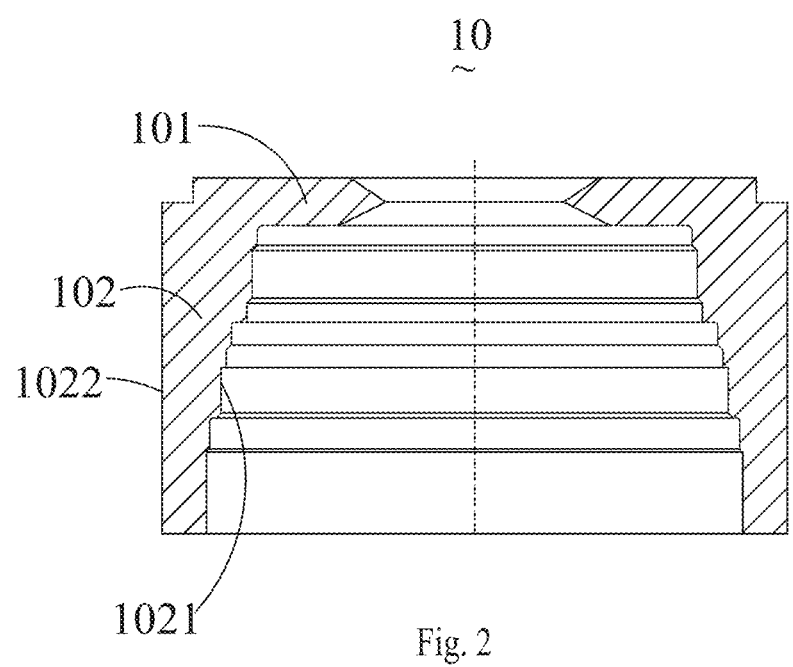
FIG. 2 is an illustrative cross-sectional view of a lens barrel of the lens module in FIG. 1.

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

As shown in FIGS. 1-5, an exemplary embodiment of the present disclosure provides a lens module, and this lens module can be used into the electric equipment, e.g.: cell phone and camera etc. The lens module includes a lens barrel 10 and a lens group arranged in the lens barrel 10. The lens group includes at least one lens 20. Generally, the lens barrel 10 has a cylinder barrel structure, and includes a first barrel wall 101 that forms an optical aperture and a second barrel wall 102 that bends and extends from the first barrel wall 101, and the second barrel wall 102 includes a first inner wall 1021 and a first outer wall 1022 opposite to the first inner wall 1021. The present disclosure takes 4 pieces of lenses for example.

The lens 20 includes a side wall 201 that connects an object side 202 and an image side 203, and the lens 20 is installed in the lens barrel 10.

The object side 202 of the lens 20 is opposite to the first barrel wall 101, and a side wall 201 is opposite to the second barrel wall 102. A part of a side wall 201 from the lens 20 is attached to the first inner wall 1021, and a gap is formed between another part and the first inner wall 1021, in which, a part in which the side wall 201 of the lens 20 is attached to the first inner wall 1021 of the lens barrel 10 is an attached part 2011, and a part forming the gap between the side wall 201 of the lens 20 and the first inner wall 1021 of the lens barrel 10 is a non-attached part. Specifically, a size of a part set by interval between the side wall 201 and the first inner wall 1021 along a direction of an optical axis accounts for at least one second of a total height of the side wall 201, i.e.: a size of the non-attached part 2012 along the direction of the optical axis is more than or equal to one second of the total height of the side wall 201, notably, the total height of the side wall 201 refers to the size of the side 201 along the direction of the optical axis.

In above structure, an upper part of the side wall 201 of the lens 20 is attached to the lens barrel 10, and there is an interval between the first inner wall 1021 and the lens 20, while the light enters into the lens module, because the interval is left between the first inner wall 1021 of the lens barrel 10 and the lens 20, while the stray light enters into this interval, it can relieve the stray light by reflection for many times, in order to reduce the stray light entering into the imaging surface receptor and improve the imaging quality.

Alternatively, one end of an attached part 2011 is connected to one end of a non-attached part 2012, preferably, the attached part 2011 is located at one side of the lens 20 near an object side 202, and the non-attached part 2012 is located at one side of the lens 20 near an imaging side 203.

For the lens 20 with the same thickness, if the size of the attached part 2011 along the direction of the optical axis is too big, the size of the non-attached part 2012 along the direction of the optical aperture will be smaller, which will weaken the extinction and reflection function of the non-attached part 2012; if the size of the attached part 2011 along the direction of the optical axis is too small, the attached area between the lens 20 and the first inner wall 1021 will become too small, which will impact the installation precision of the lens 20. Therefore, the size of the attached part 2011 along the direction of the optical axis is less than or equal to one third of the size of the side wall 201 along the direction of the optical axis, i.e.: the size of a projection of the attached part 2011 on the first inner wall 1021 along a direction vertical to an optical axis is less than or equal to one third of the size of a projection of the side wall 201 on the first inner wall 1021 along the direction vertical to the optical axis, in other words, a projection of the attached part 2011 on the first inner wall 1021 along the direction vertical to the optical axis is a first project, and a projection of the whole side wall 201 on the first inner wall 1021 is a second projection, at the direction of the optical axis, the size of the first projection is less than or equal to one third of the size of the second project. Preferably, the size of the first projection is about one third of the size of the second projection.

In which, the non-attached part 2012 is vertical to the radius along the direction of the optical axis, which decreases gradually from the object side to the image side, in order to increase the area of the non-attached part 2012 and relieve the light in a better manner, and install the lens 20 in a convenient manner.

Further, the radius of the non-attached part 2012 along the direction of the optical axis can be changing/not changing continuously; preferably, the radius of the non-attached part 2012 along the direction of the optical axis is changing continuously for the convenience of processing, in order to relieve the stray light in a better manner.

Certainly, the radius of the non-attached part 2012 vertical to the direction of the optical axis can also be the same along the direction of the optical axis.

Figure 3:
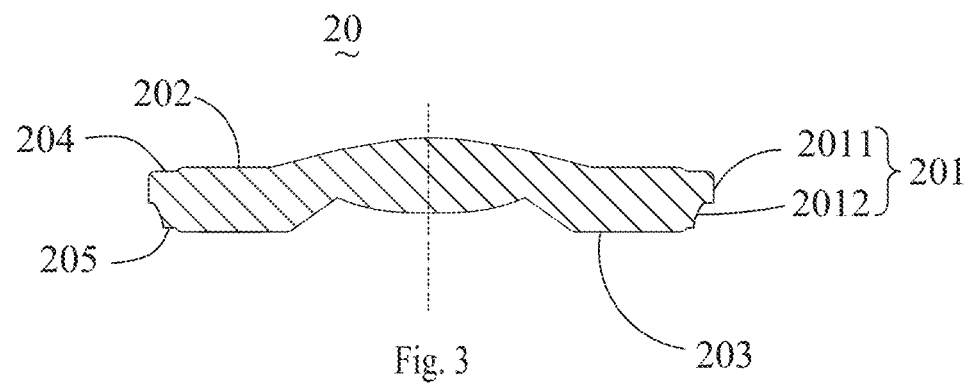
FIG. 3 is an illustrative cross-sectional view of a lens of the lens module in FIG. 1.
Figure 5:
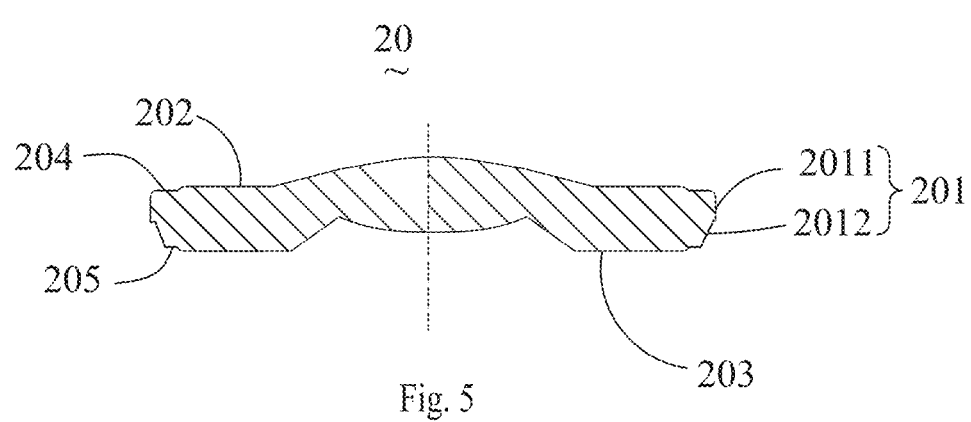
FIG. 5 is an illustrative cross-sectional view of a lens of the lens module in FIG. 4.

Further, whether the radius of the non-attached part 2012 vertical to the direction of the optical axis is changing continuously along the direction of the optical axis or not, in a radial sectional diagram of the lens 20, as shown in FIGS. 3 and 5, at least a part of the non-attached part 2012 can be a straight line or curve, in other words, in the radial sectional diagram of the lens 20, various lines can be set using several methods as follows:

For the first method, the non-attached part 2012 is a whole curve or a separate curve, as shown in FIGS. 1 and 3, this curve can be an arc, e.g.:

a round arc, a dual curve or an oval arc etc., or this curve is a broken line, while the radius of the non-attached part 2012 vertical to the direction of the optical axis decreases along the direction of the optical axis, one end of this curve away from the attached part 2011 is closer to the optical axis comparing with the other end near the attached part 2011. Understandably, while the radius of the non-attached part 2012 vertical to the direction of the optical axis is not changing continuously along the direction of the optical axis, the non-attached part 2012 can be a ladder structure, i.e.: the straight line from the non-attached part 2012 is a broken line in the radial sectional diagram of the lens 20.

Figure 4:
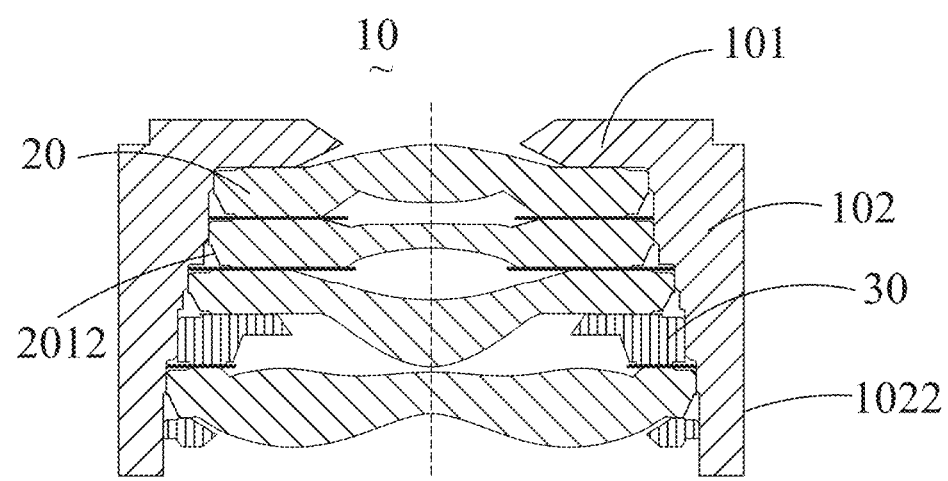
FIG. 4 is an illustrative cross-sectional view of a lens module in accordance with another exemplary embodiment of the present disclosure.

For the second method, the non-attached part 2012 is a whole straight line, as shown in FIGS. 4-5, this straight line can be parallel with the optical axis or have a non-zero angle with the optical axis. While the radius of the non-attached part 2012 vertical to the direction of the optical axis decreases along the direction of the optical axis, this straight line is set opposite to the optical axis in an inclined manner, and one end of this straight line away from the attached part 2011 is closer to the optical axis comparing with the other end near the attached part 2011.

For the third method, in one line where one part is a curve and another part is a straight line, and one part from both the curve and straight line can be closer to the attached part 2011 than the other.

In addition, among various above embodiments, in the radial sectional diagram of the lens 20, a part where the non-attached part 2012 is a straight line receives an extinction treatment, if its surface is black, use the method like painting to further increase the extinction function of the non-attached part 2012.

Similarly, in the radial sectional diagram of the lens 20, a part of the non-attached part 2012 that is a curve receives a Lambertian treatment, in order to further increase the extinction function of the non-attached part 2012. Certainly, a part of the non-attached part 2012 that is not a curve can receive both a Lambertian treatment and an extinction treatment.

An object side 202 of a lens 20 is provided with a first depression part 204 depressing towards an object side 203, and an image side 203 of the lens 20 is set with a second depression part 205 depressing towards the object side 202.

Among various above embodiments, there can be only one piece of lens 20 set with the non-attached part 2012, or several other lenses set with the non-attached part 2012, preferably, there are parts of the side walls from various lens are attached to a first inner wall 1021, and parts of them share intervals with the first inner wall 1021, i.e.: all the lenses in a lens barrel 10 are set with the attached parts and the non-attached parts, and the attached parts and the non-attached parts from various lens can use any structure from any above embodiment. Using this setting method can make more side walls used for relieving the stray light, in order to play an extinction role in a better manner.

Generally, while installing many pieces of lens, a lens module also includes a shading board 30, and the shading board 30 is set between two adjacent lenses.

It needs to state that the shading unit can be set between the first lens 30 and the second lens 31 or the second lens 31 and the third lens 32 in other embodiment. The present disclosure does not define it and the quantity of lens either.

Besides, the lens barrel 2 works as the supporting body of supporting all lenses and protects all lenses on the other side. For example, the lens barrel 2 has the first surface 20 and the second surface 21 arranged along the extension direction of the optical axis O. All lenses are located in the space limited by the first surface 20 and the second surface 21.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module including:
   a lens barrel including a first barrel wall forming an optical aperture and a second barrel wall bending and extending from the first barrel wall, the second barrel wall including a first inner wall and a first outer wall opposite to the first inner wall;
   at least one lens arranged in the lens barrel, the lens including a side wall connecting an object side and an image side, a part of the side wall from the lens attaching to the first inner wall;
   a gap formed between another part of the side wall and the first inner wall; wherein
   a size of the part forming the gap between the side wall and the first inner wall along a direction of an optical axis accounts for at least one-half of the total height of the side wall;
   a part of the side wall where the side wall is attached to the first inner wall is an attached part, and a part of the side wall in which there is the gap between the side wall and the first inner wall is a non-attached part, and a size of the attached part of the side wall along a direction parallel to the optical axis is less than or equal to one third of a size of the entire side wall along the direction parallel to the optical axis;
   a part of the non-attached part is Lambertian surface.

2. The lens module as described in claim 1, wherein a radius of the non-attached part parallel to the optical axis is changing continuously along the optical axis.

3. The lens module as described in claim 2, wherein the radius of the non-attached part parallel to the optical axis is decreasing gradually from the object side to the image side along the optical axis.

4. The lens module as described in claim 1, wherein a radius of the non-attached part parallel to the optical axis is not changing continuously along the optical axis.

5. The lens module as described in claim 1, wherein at least a part of a non-attached part is a straight line in a radial cross section of the lens.

6. The lens module as described in claim 1, wherein at least a part of the non-attached part is a curve.

* * * * *